(12) United States Patent
Kajitani

(10) Patent No.: US 8,928,974 B2
(45) Date of Patent: Jan. 6, 2015

(54) INVERTED MICROSCOPE

(71) Applicant: Olympus Corporation, Tokyo (JP)

(72) Inventor: Kazuo Kajitani, Tokyo (JP)

(73) Assignee: Olympus Corporation, Tokyo (JP)

( * ) Notice: Subject to any disclaimer, the term of this patent is extended or adjusted under 35 U.S.C. 154(b) by 248 days.

(21) Appl. No.: 13/675,408

(22) Filed: Nov. 13, 2012

(65) Prior Publication Data

US 2013/0128345 A1   May 23, 2013

(30) Foreign Application Priority Data

Nov. 18, 2011   (JP) .................................. 2011-252673

(51) Int. Cl.
  *G02B 21/02* (2006.01)
  *G02B 21/00* (2006.01)
  *G02B 21/20* (2006.01)

(52) U.S. Cl.
  CPC ............ *G02B 21/02* (2013.01); *G02B 21/0088* (2013.01); *G02B 21/20* (2013.01)
  USPC ........................................... 359/380; 359/432

(58) Field of Classification Search
  CPC .............................. G02B 21/02; G02B 21/0088
  USPC ................................................. 359/380, 432
  See application file for complete search history.

(56) References Cited

U.S. PATENT DOCUMENTS

| | | | | |
|---|---|---|---|---|
| 3,202,047 | A * | 8/1965 | Lawler ........................... | 359/384 |
| 4,158,475 | A * | 6/1979 | Dianetti et al. ............... | 359/368 |
| 4,204,748 | A * | 5/1980 | Yonekubo ..................... | 359/791 |
| 5,255,121 | A | 10/1993 | Suzuki | |
| 5,808,791 | A * | 9/1998 | Kawano et al. ............... | 359/434 |
| 5,847,866 | A | 12/1998 | Otaki | |
| 6,813,071 | B2 * | 11/2004 | Takahama ..................... | 359/381 |
| 7,224,524 | B2 * | 5/2007 | Tsuchiya et al. .............. | 359/387 |
| 2002/0131165 | A1 * | 9/2002 | Takahama ..................... | 359/381 |
| 2002/0171925 | A1 * | 11/2002 | Tonooka et al. .............. | 359/381 |
| 2007/0183030 | A1 * | 8/2007 | Tsuchiya et al. ............. | 359/388 |
| 2010/0142037 | A1 * | 6/2010 | Nakayama .................... | 359/380 |
| 2012/0327509 | A1 * | 12/2012 | Murayama et al. ........... | 359/385 |

FOREIGN PATENT DOCUMENTS

JP   3250739   1/2002

OTHER PUBLICATIONS

European Search Report, dated Dec. 6, 2012, issued in corresponding European Patent Application No. 12192198.5.

* cited by examiner

*Primary Examiner* — Frank Font
(74) *Attorney, Agent, or Firm* — Kenyon & Kenyon LLP

(57) ABSTRACT

Provided is an inverted microscope 1 comprising an objective optical system 2 that collects light from a specimen A; an image-forming optical system 3 that images the light from the specimen A that has been collected by the objective optical system 2 to form an intermediate image; a relay optical system 6 that relays the intermediate image B of the specimen A formed by the image-forming optical system 3; a binocular lens barrel 5 that splits the light from the relay optical system 6; a pair of ocular optical systems 4 that image, in a magnified manner, the intermediate images that have been split by the binocular lens barrel 5 on eyes E of an observer as virtual images; wherein the following conditional expressions are satisfied:

$K=(Fntl/Ftl)\times \beta RL$ (1), $Fne=Fe\times K$ (2), and $0.3<K<0.9$ (3).

7 Claims, 7 Drawing Sheets

INVERTED MICROSCOPE

CROSS-REFERENCE TO RELATED APPLICATIONS

This application is based on Japanese Patent Application No. 2011-252673, the contents of which are incorporated herein by reference.

BACKGROUND OF THE INVENTION

1. Field of the Invention

The present invention relates to an inverted microscope.

2. Description of Related Art

In the related art, there is a known ultrawide-field ocular lens for a microscope (for example, see the Publication of Japanese Patent No. 3250739).

This ocular lens is an ultrawide-field ocular lens of the 10× magnification, 26.5 field number class.

With the ocular lens disclosed in the Publication of Japanese Patent No. 3250739, however, because of the large lens diameter, great overall length, and large number of lenses, the ocular lens itself is large. In addition, in order to achieve the field number of 26.5, a prism provided in a binocular lens barrel, which is connected to the ocular lens, has to have an effective area with a diameter of 26.5 mm or more in a sectional plane orthogonal to the optical axis, and thus, the prism to be used inevitably needs to have an outer dimension of 30 mm, making the binocular lens barrel larger, heavier, and more expensive.

An object of the present invention is to provide an inverted microscope that is configured to have a shorter, lighter, and cheaper ocular optical system and binocular lens barrel, while being capable of performing observation over an ultrawide field of view.

BRIEF SUMMARY OF THE INVENTION

An aspect of the present invention provides an inverted microscope comprising an objective optical system that collects light from a specimen; an image-forming optical system that images the light from the specimen that has been collected by the objective optical system to form an intermediate image; a relay optical system that relays the intermediate image formed by the image-forming optical system; an light-splitting unit that splits the light from the relay optical system; and a pair of ocular optical systems that image, in a magnified manner, the intermediate images that have been split by the light-splitting unit as on eyes of an observer virtual images; wherein following conditional expressions are satisfied:

$$K = (Fntl/Ftl) \times \beta RL \quad (1),$$

$$Fne = Fe \times K \quad (2), \text{ and}$$

$$0.3 < K < 0.9 \quad (3),$$

where K is a coefficient; Fntl is a focal length of the image-forming optical system; Ftl is a focal length of a reference image-forming optical system having a magnification of 1×; $\beta RL$ is a magnification of the relay optical system; Fne is a focal length of the ocular optical system; and Fe is a focal length of a reference ocular optical system in an inverted microscope including the reference image-forming optical system and a reference objective optical system.

DETAILED DESCRIPTION OF THE INVENTION

First Embodiment

An inverted microscope 1 according to a first embodiment of the present invention will be described below with reference to the drawings.

Figure 1:
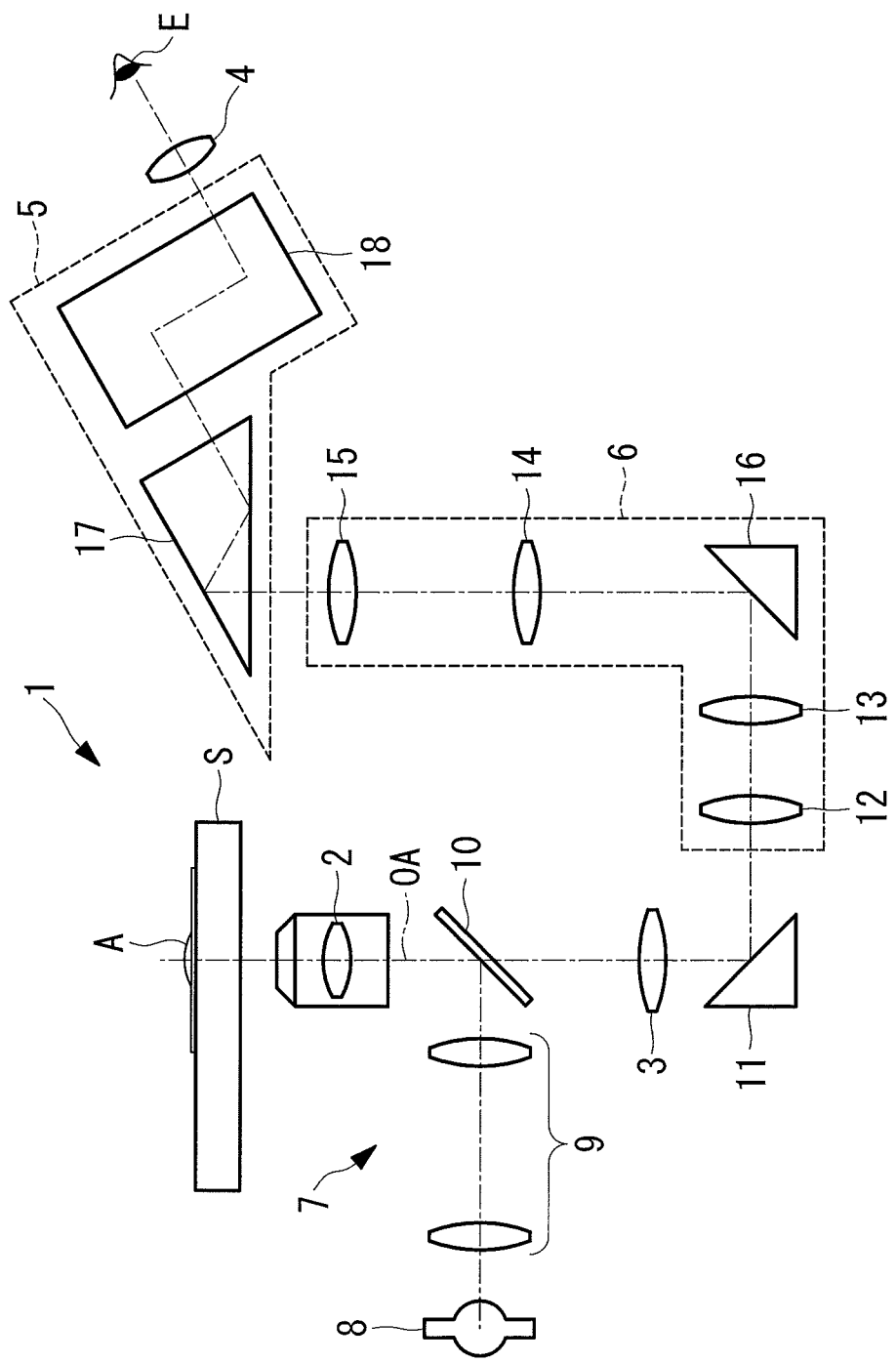
FIG. 1 is a diagram showing an inverted microscope according to a first embodiment of the present invention.

As shown in FIG. 1, the inverted microscope 1 according to this embodiment is provided with an objective optical system 2 arranged below a stage S, on which a specimen A is placed, an illumination optical system 7 that supplies illumination light to be radiated onto the specimen A through the objective optical system 2, an image-forming optical system 3 that images an intermediate image by focusing the light composed of an infinity beam from the specimen A, a relay optical system 6 that relays the intermediate image that has been imaged by the image-forming optical system 3 and reflected by a mirror 11 in the horizontal direction, a binocular lens barrel 5 (an light-splitting unit) that splits the intermediate image that has been relayed by the relay optical system 6 into two images, and ocular optical systems 4 that respectively image, in a magnified manner, the intermediate images of the specimen A at the positions where retinas of both eyes E of an observer are arranged.

The objective optical system 2 collects the light from the specimen A and guides it vertically downwards as a substantially infinity beam.

The illumination optical system 7 is provided with a light source 8 for emitting illumination light, such as a mercury-vapor lamp, a focusing optical system 9 that focuses the illumination light from the light source 8, and a dichroic mirror 10 that deflects the illumination light focused by the focusing optical system 9 in the direction along an optical axis OA of the objective optical system 2. The focal point of the focusing optical system 9 coincides with the back focal point of the objective optical system 2 so that the specimen A can be irradiated with the illumination light composed of substantially collimated light.

The relay optical system 6 relays the intermediate image that has been imaged by the image-forming optical system 3 and reflected in the horizontal direction by the mirror 11, and is provided with a plurality of relay lenses 12 to 15. In addition, a mirror 16, which reflects the horizontal beam in the vertical direction, is arranged between the relay lens 13 and the relay lens 14.

The binocular lens barrel 5 is provided with a prism 17 that reflects the beam that has passed through the relay optical system 6 in an upwardly inclined direction and a binocular-splitting prism 18 that splits the light that has been reflected by the prism 17 into two beams.

The respective ocular optical systems 4 image, in a magnified manner, the intermediate images of the specimen A that have been relayed by the relay optical system 6 at positions where the retinas of both eyes E of an observer are placed. The ocular optical systems 4 are a pair of optical systems that respectively correspond to the two beams that have been split by the binocular-splitting prism 18.

According to the inverted microscope 1 of this embodiment, the illumination light emitted from the light source 8 of the illumination optical system 7 is focused by the focusing optical system 9 and is then deflected by the dichroic mirror 10 in the direction along the optical axis OA of the objective optical system 2. The illumination light is then radiated by the objective optical system 2 onto the specimen A, which is arranged on the stage S vertically above the objective optical system 2.

The light emitted downwards from the specimen A is collected by the objective optical system 2 and converted to a substantially infinity beam, which is directed vertically downwards and enters the image-forming optical system 3 through the dichroic mirror 10. The beam that has entered the image-forming optical system 3 is reflected by the mirror 11 from the vertical direction to the horizontal direction and enters the relay lens 12 of the relay optical system 6. In the relay optical system 6, the horizontal beam that has entered is reflected vertically upwards by the mirror 16, thereby allowing the beam to enter the binocular lens barrel 5. In the binocular lens barrel 5, the beam that has been reflected by the prism 17 is split into two beams by the binocular-splitting prism 18. The intermediate image of the specimen A is then magnified and imaged by the pair of ocular optical systems 4 at the positions where the retinas of both eyes E of an observer are arranged. An observer can observe an image of the specimen A in detail by positioning both eyes E at the focal points of the ocular optical systems 4.

Figure 2:
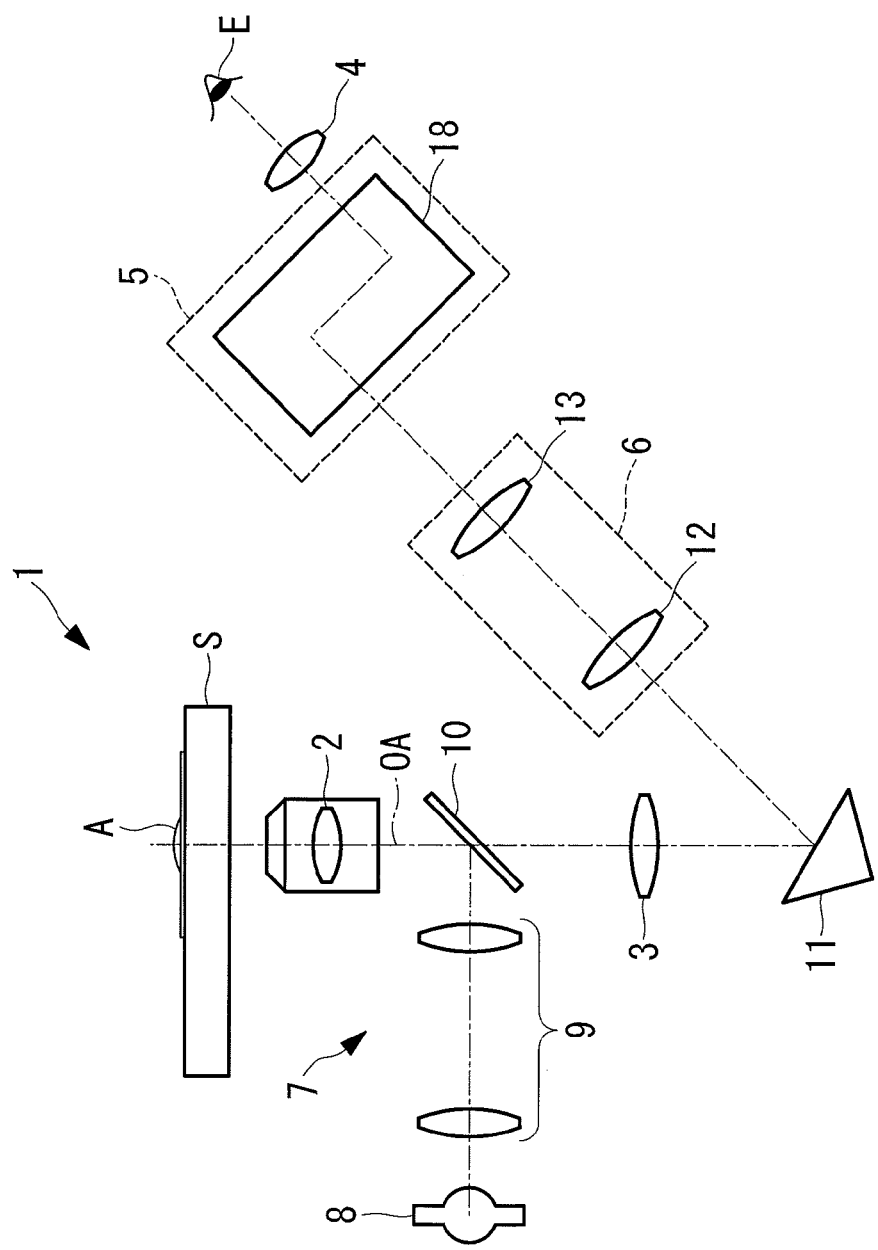
FIG. 2 is a diagram showing a modification of the inverted microscope according to the first embodiment of the present invention.

Although the direction of the beam is changed twice at the mirror 11 and the mirror 16 in the inverted microscope 1 shown in FIG. 1, a modification shown in FIG. 2, in which the direction of the beam is changed once at the mirror 11, may also be employed. In the relay optical system 6 shown in FIG. 2, the mirror 16, the relay lens 14, and the relay lens 15 are omitted from the relay optical system 6 shown in FIG. 1. In addition, in the binocular lens barrel 5 shown in FIG. 2, the prism 17 is omitted from the binocular lens barrel 5 shown in FIG. 1. In FIG. 2, the parts having the same reference numerals as in FIG. 1 will be considered to be similar to those in FIG. 1, and descriptions thereof will be omitted.

Next, a microscope optical system of the inverted microscope 1 according to this embodiment will be described in comparison with a reference example.

As shown in FIG. 3(a), the microscope optical system of the inverted microscope 1 according to this embodiment is provided with the objective optical system 2 that collects the light from the specimen A, the image-forming optical system 3 that images the light from the specimen A that has been collected by the objective optical system 2 as an intermediate image B, the relay optical system 6 that relays the intermediate image B imaged by the image-forming optical system 3, the binocular lens barrel 5 (light-splitting unit) that splits the light from the relay optical system 6 into two images, and the ocular optical systems 4 that image, in a magnified manner, intermediate images C of the specimen A that have been split by the binocular lens barrel 5 (light-splitting unit) on the eyes E of an observer as virtual images D with viewing angle 2ω.

As a reference example, FIG. 3(b) shows a microscope optical system of an inverted microscope 1' having a reference objective optical system 2', a reference image-forming optical system 3' having a magnification of 1×, a reference ocular optical systems 4' having a magnification of 10×, a binocular lens barrel 5', and a reference relay optical system 6' having a magnification of 1×.

Figure 3:
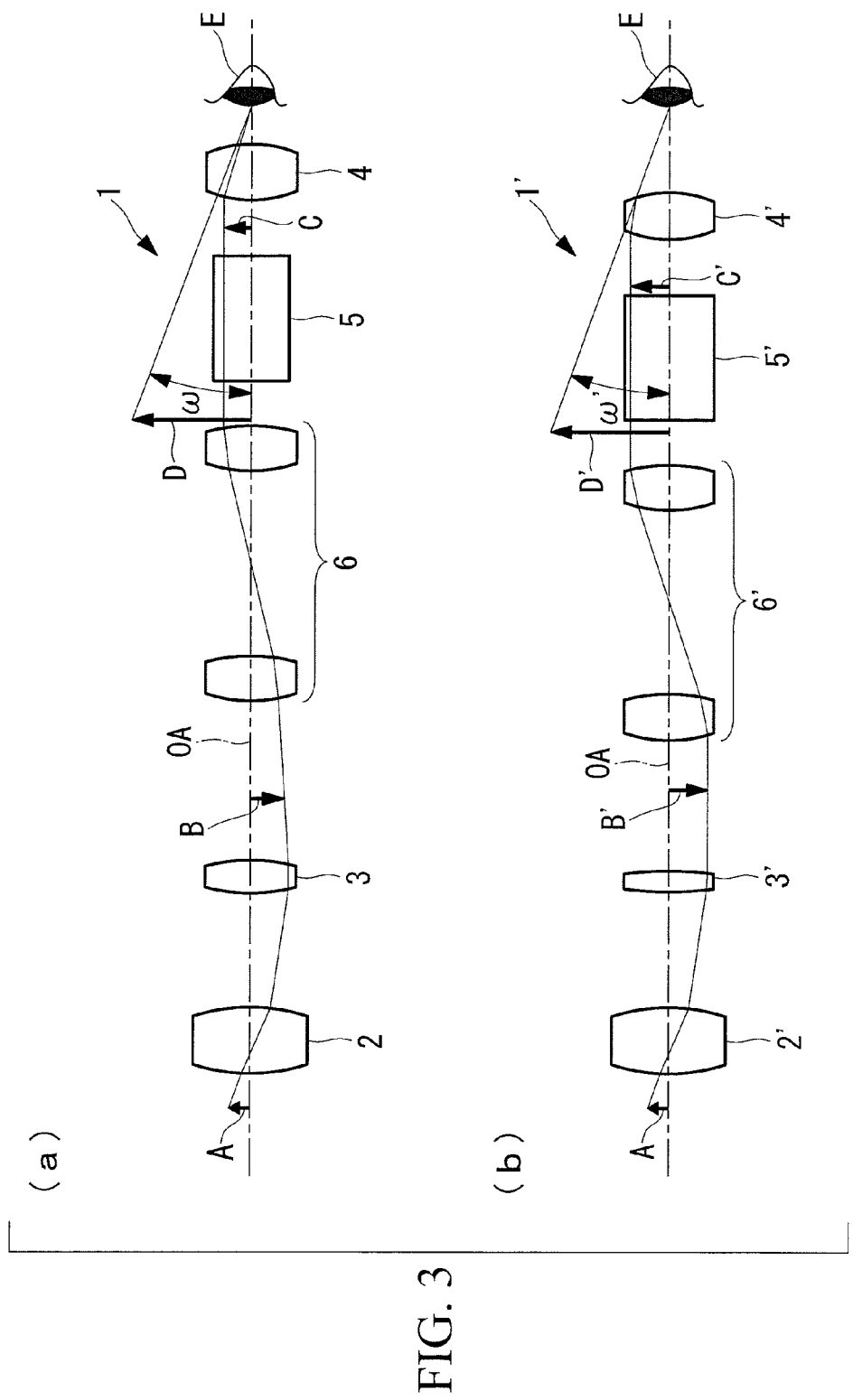
FIG. 3 is a diagram showing (a) the inverted microscope according to the first embodiment of the present invention and (b) a conventional inverted microscope.

Although the optical systems are each shown as single lenses in FIG. 3, in practice, they are respectively constructed of a plurality of lenses.

The inverted microscope 1 according to this embodiment satisfies the following conditional expressions:

$$K=(Fntl/Ftl)\times \beta RL \qquad (1),$$

$$Fne=Fe\times K \qquad (2), \text{ and}$$

$$0.3<K<0.9 \qquad (3),$$

where K is a coefficient, Fntl is the focal length of the image-forming optical system 3, Ftl is the focal length of the reference image-forming optical system 3' having a magnification of 1×, βRL is the magnification of the relay optical system 6, Fne is the focal length of the ocular optical systems 4, and Fe is the focal length of the reference ocular optical systems 4' in the inverted microscope 1' including the reference image-forming optical system 3' and the reference objective optical system 2'.

According to the thus-configured inverted microscope 1 of this embodiment, when the light from the specimen A is collected by the objective optical system 2 and enters the image-forming optical system 3 as substantially collimated light, the image-forming optical system 3 focuses the light to form the intermediate image B, and subsequently, the light enters the relay optical system 6 and then enters the ocular optical systems 4 through the binocular lens barrel 5.

In this case, with the inverted microscope 1 according to this embodiment, in comparison with the inverted microscope 1' having the reference image-forming optical system 3' having a magnification of 1×, the reference relay optical system 6' having a magnification of 1×, and the reference ocular optical systems 4' having a magnification of 10×, the focal length Fne of the ocular optical systems 4 is reduced, increasing the magnification. In addition, the overall magnification of the objective optical system 2, the image-forming optical system 3, and the relay optical system 6 is reduced by the same percentage as that of the increase in magnification of the ocular optical systems 4. As a result, it is possible to make the field numbers of the ocular optical systems 4 substantially the same without changing the overall magnification of the inverted microscope 1. In this embodiment, the objective optical system 2 shown in FIG. 3(a) is the same as the reference objective optical system 2' shown in FIG. 3(b).

With the inverted microscope 1 according to this embodiment, the focal length Fntl of the image-forming optical system 3 is made shorter compared with that of the reference image-forming optical system 3'. Accordingly, the magnification of the image-forming optical system 3 is reduced, and the intermediate image B formed by the image-forming optical system 3 is diminished, which makes it possible to reduce the diameter of the beam passing through the binocular lens barrel 5. As a result, it is possible to reduce the size of the binocular-splitting prism 18 in the binocular lens barrel 5, which affords an advantage in that the size of the binocular lens barrel 5 can be reduced.

Furthermore, with the inverted microscope 1 according to this embodiment, the focal length Fne of the ocular optical system 4 is made shorter, and the overall magnification of the image-forming optical system 3 and the relay optical system 6 is reduced by the same percentage thereas. Accordingly, the overall magnification of the inverted microscope 1 does not change. Although the image height of the intermediate image C is K times the image height of an intermediate image C', the heights of the virtual images D and D' viewed by the eyes (E) are the same, and the field numbers can be made substantially the same. "Making the field numbers substantially the same" means that the viewing angle 2ω' of the reference ocular optical systems 4' and the viewing angle 2ω of the ocular optical systems 4 become the same.

In the inverted microscope 1 according to this embodiment, the above-mentioned coefficient K takes a value of $0.3 < K < 0.9$. The coefficient K is set in this manner because if $K \leq 0.3$, then the focal length of the image-forming optical system becomes too short, making it impossible to ensure a sufficient air-equivalent optical path length before splitting into left/right images in the binocular lens barrel, or the magnification of the relay optical system becomes too small, making the design thereof more difficult. In addition, if $K \geq 0.9$, then it is not possible to reduce the prism size in practice.

Furthermore, the inverted microscope 1 preferably satisfies the following conditional expression:

$$15 < FN < 22 \quad (4),$$

where FN is the field number of the ocular optical system 4 and is equal to the diameter of the intermediate image C.

In addition, the inverted microscope 1 preferably satisfies the following conditional expression:

$$0.45 < K \quad (5).$$

Accordingly, in comparison with the case in which K 0.45, the focal length of the ocular optical systems can be made longer, and the comatic aberration characteristics of the ocular optical systems are improved.

In addition, the inverted microscope 1 preferably satisfies the following conditional expressions:

$$140 < Fntl < 210 \quad (6),$$

$$0.55 < \beta RL < 1.1 \quad (7), \text{ and}$$

$$8 < Fne < 23 \quad (8).$$

Because it is necessary to extend the optical path in order to accommodate a mechanism in variable tilt-angle lens barrels or lens barrels that are capable of reducing the eye-point distance of an ocular lens, they include a relay system in an image-forming optical system; however, the present invention can be applied by considering an optical system arranged between an objective optical system and an ocular optical system as an image-forming optical system.

EXAMPLES

First Example

Figure 4:
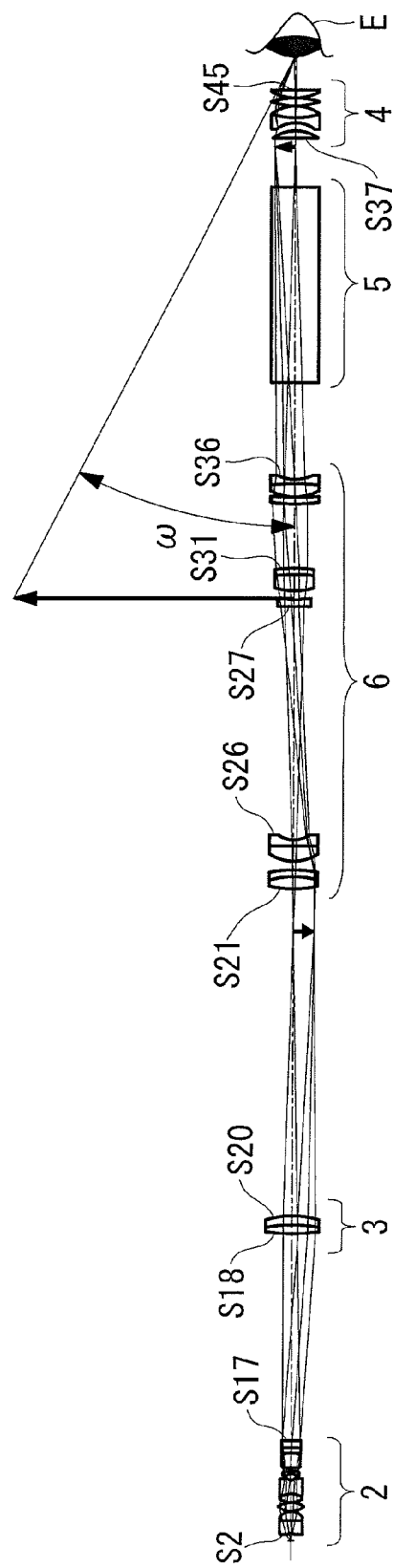
FIG. 4 is a diagram showing a lens arrangement according to a first Example of the inverted microscope shown in FIG. 1.
Figure 5:
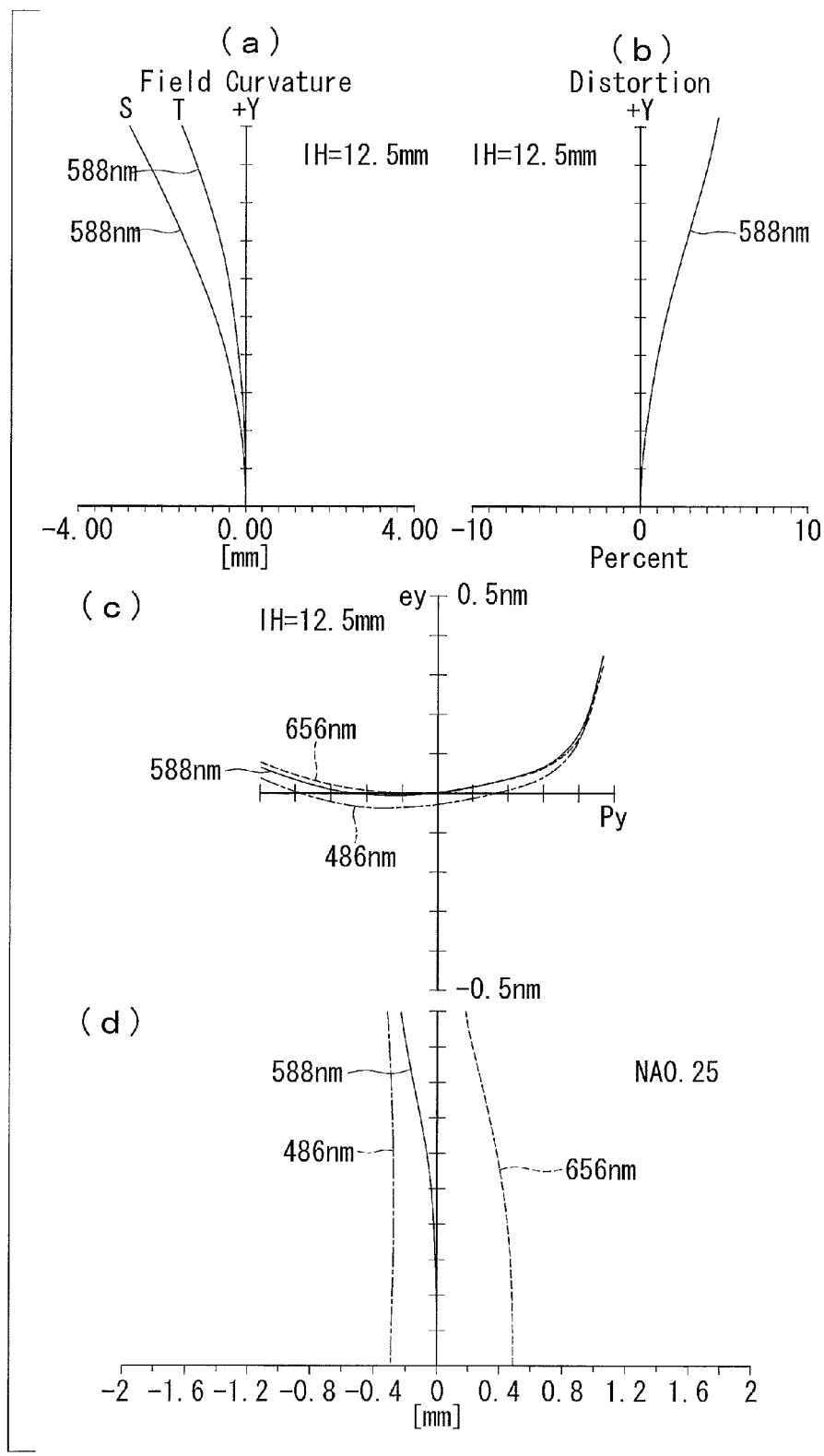
FIG. 5 is an aberration diagram of the inverted microscope shown in FIG. 4.

Next, a first Example of the inverted microscope 1 according to the first embodiment of the present invention will be described below. A lens arrangement of the inverted microscope 1 according to this Example is shown in FIG. 4, lens data therefor is shown in Table 1, and aberration diagrams therefor are shown in FIG. 5. The prism in the binocular lens barrel 5 is contained in the intersurface distance of surface number 36 after calculating the air-equivalent distance. In FIG. 4, only some of the surface numbers are shown, and the rest are omitted.

FIG. 5(*a*) is field curvature (astigmatic difference), FIG. 5(*b*) is distortion, FIG. 5(*c*) is off-axis lateral aberration (comatic aberration, magnification chromatic aberration), and FIG. 5(*d*) is spherical aberration. Each aberration shows the aberration calculated by arranging an ideal lens having a focal length of 25 mm instead of the eye E behind the ocular optical system 4.

TABLE 1

| SURFACE NUMBER | CURVATURE RADIUS | SPACING | REFRACTURE INDEX | ABBE NUMBER |
|---|---|---|---|---|
| OBJECT SURFACE | ∞ | 0.17 (cover glass) | 1.521 | 56 |
| 1 | ∞ | 3.59(WD) | | |
| (OBJECTIVE OPTICAL SYSTEM 2) | | | | |
| 2 | −11.16 | 6.3 | 1.6935 | 53.2 |
| 3 | ∞ | 4.5 | 1.4343 | 94.8 |
| 4 | −10.14 | 0.18 | | |
| 5 | 12.98 | 4.05 | 1.4343 | 94.8 |
| 6 | −14.35 | 0.18 | | |
| 7 | 11.31 | 4.5 | 1.4338 | 95.0 |
| 8 | −10.04 | 7.02 | 1.72 | 50.3 |
| 9 | 12.18 | 2.97 | | |
| 10 | −5.69 | 0.9 | 1.5725 | 57.7 |
| 11 | 112.56 | 2.07 | 1.4978 | 82.6 |
| 12 | −10.77 | 0.18 | | |
| 13 | −139.45 | 6.75 | 1.7859 | 44.2 |
| 14 | −17.46 | 0.45 | | |
| 15 | 545.57 | 1.8 | 1.6228 | 57.0 |
| 16 | 16.13 | 4.05 | 1.4978 | 82.6 |
| 17 | −42.23 | 102 | | |
| (IMAGING OPTICAL SYSTEM 3) | | | | |
| 18 | 135.09 | 4.8 | 1.497 | 81.5 |
| 19 | −49.98 | 4.0 | 1.8044 | 39.6 |
| 20 | −85.54 | 161.92 | | |
| (RELAY OPTICAL SYSTEM 6) | | | | |
| 21 | 78.79 | 5.5 | 1.6031 | 60.6 |
| 22 | −37.35 | 2.9 | 1.8052 | 25.4 |
| 23 | −112.22 | 4.38 | | |
| 24 | 21.27 | 7.67 | 1.744 | 44.8 |
| 25 | ∞ | 3.3 | 1.741 | 52.6 |
| 26 | 15.46 | 114.89 | | |
| 27 | −197.29 | 2.98 | 1.5085 | 61.2 |
| 28 | 38.36 | 4.9 | | |
| 29 | 48.8 | 7.88 | 1.456 | 90.3 |
| 30 | −31.16 | 3.15 | 1.5085 | 61.2 |
| 31 | −42.51 | 31.3 | | |
| 32 | 57.99 | 3.17 | 1.4875 | 70.2 |
| 33 | 294.37 | 0.35 | | |
| 34 | 34.35 | 6.33 | 1.7234 | 38.0 |
| 35 | −95.99 | 2.74 | 1.7185 | 33.5 |
| 36 | 27.37 | 165.67 | | |
| (OCULAR OPTICAL SYSTEM 4) | | | | |
| 37 | ∞ | 3.84 | 1.7859 | 44.2 |
| 38 | −25.0 | 3.95 | | |
| 39 | −17.02 | 2.25 | 1.8052 | 25.4 |
| 40 | 31.5 | 5.92 | 1.6516 | 58.5 |
| 41 | −31.5 | 0.14 | | |
| 42 | 80.44 | 3.6 | 1.744 | 44.8 |
| 43 | −47.22 | 0.14 | | |
| 44 | 23.58 | 4.32 | 1.5688 | 56.4 |
| 45 | ∞ | | | |

K = 0.8
Fntl = 144
Ftl = 180
βRL = 1.0
Fne = 20
Fe = 25
FN = 20
2ω = 53.1°
Fob = 18
M' = Ftl/Fob × 250/Fe = 100
M = Fntl/Fob × βRL × 250/Fne = 100

In the above, K is a coefficient, Fntl is the focal length of the image-forming optical system 3, Ftl is the focal length of a reference image-forming optical system 3' having a magnification of 1×, βRL is the magnification of the relay optical system 6, Fne is the focal length of the ocular optical system 4, Fe is the focal length of the reference ocular optical system 4' in the inverted microscope 1' including the reference image-forming optical system 3' and the reference objective optical system 2', FN is the field number of the ocular optical system 4, which is equal to the diameter of the intermediate image C, 2ω is the viewing angle of the ocular optical system 4, M is the overall magnification of the inverted microscope 1 of this Example, Fob is the focal length of the objective optical system 2 and the reference objective optical system 2', and M' is the overall magnification of the inverted microscope 1' including the reference objective optical system 2', the reference image-forming optical system 3', and the reference ocular optical system 4'.

Second Example

Next, a second Example of the inverted microscope 1 according to the first embodiment of the present invention will be described below.

Figure 6:
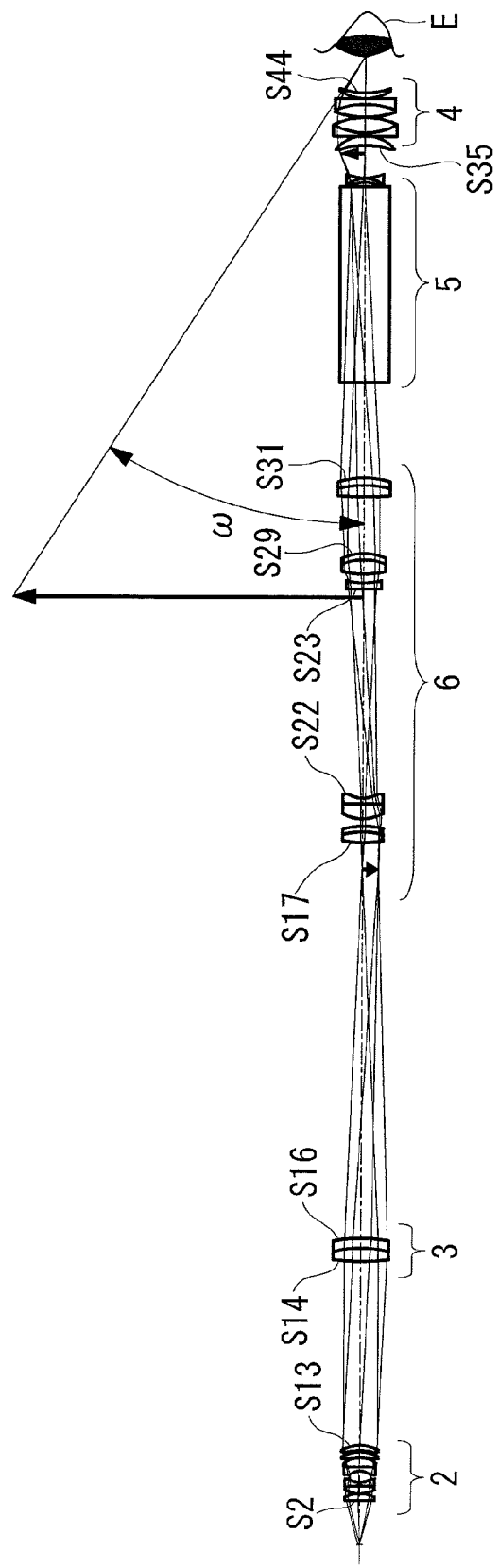
FIG. 6 is a diagram showing a lens arrangement according to a second Example of the inverted microscope shown in FIG. 1.
Figure 7:
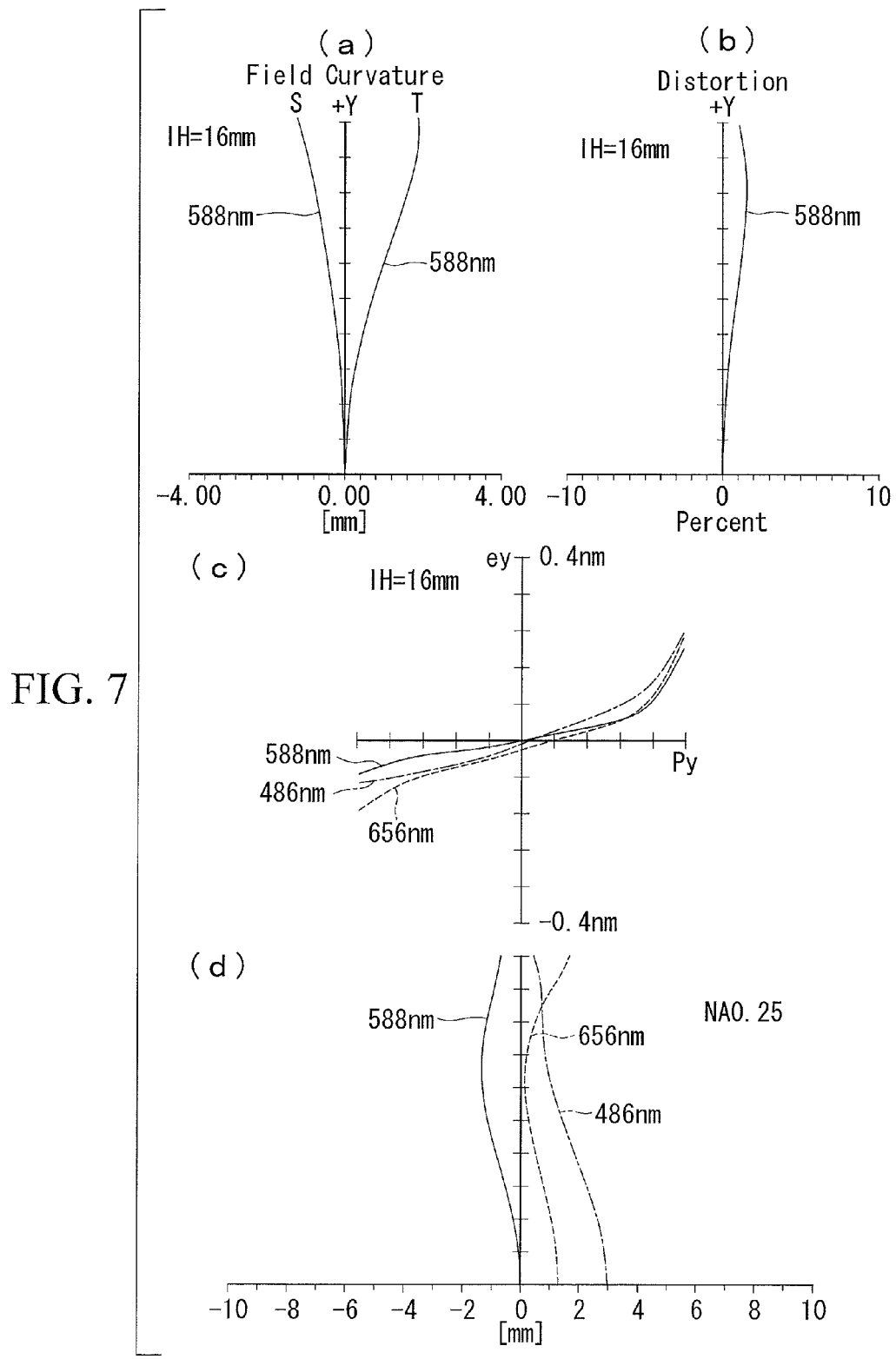
FIG. 7 is an aberration diagram of the inverted microscope shown in FIG. 6.

A lens arrangement of the inverted microscope 1 according to this Example is shown in FIG. 6, lens data therefor is shown in Table 2, and aberration diagrams therefor are shown in FIG. 7. The prism of the binocular lens barrel 5 is contained in the intersurface distance of surface number 31 after calculating the air-equivalent distance. In FIG. 6, only some of the surface numbers are shown, and the rest are omitted.

FIG. 7(a) is field curvature (astigmatic difference), FIG. 7(b) is distortion, FIG. 7(c) is off-axis lateral aberration (comatic aberration, magnification chromatic aberration), and FIG. 7(d) is spherical aberration. Each aberration shows the aberration calculated by arranging an ideal lens having a focal length of 25 mm instead of the eye E behind the ocular optical system 4.

TABLE 2

| SURFACE NUMBER | CURVATURE RADIUS | SPACING | REFRACTURE INDEX | ABBE NUMBER |
|---|---|---|---|---|
| OBJECT SURFACE | ∞ | 0.17 (cover glass) | 1.521 | 56 |
| 1 | ∞ | 22.86(WD) | | |
| (OBJECTIVE OPTICAL SYSTEM 2) | | | | |
| 2 | 55.38 | 3.44 | 1.497 | 81.5 |
| 3 | −26.01 | 0.24 | | |
| 4 | 15.43 | 4.43 | 1.6779 | 55.3 |
| 5 | −52.53 | 1.62 | 1.5317 | 48.9 |
| 6 | 10.57 | 6.37 | | |
| 7 | −10.02 | 1.75 | 1.5955 | 39.2 |
| 8 | 111.49 | 5.18 | 1.497 | 81.5 |
| 9 | −20.91 | 0.72 | | |
| 10 | −52.75 | 2.68 | 1.4875 | 70.2 |
| 11 | −21.88 | 0.56 | | |
| 12 | −52.75 | 2.68 | 1.4875 | 70.2 |
| 13 | −21.88 | 102 | | |
| (IMAGING OPTICAL SYSTEM 3) | | | | |
| 14 | 187.63 | 6.67 | 1.497 | 81.5 |
| 15 | −69.42 | 5.56 | 1.8044 | 39.6 |
| 16 | −118.8 | 217.57 | | |

TABLE 2-continued

| SURFACE NUMBER | CURVATURE RADIUS | SPACING | REFRACTURE INDEX | ABBE NUMBER |
|---|---|---|---|---|
| (RELAY OPTICAL SYSTEM 6) | | | | |
| 17 | 78.79 | 5.5 | 1.6031 | 60.6 |
| 18 | −37.35 | 2.9 | 1.8052 | 25.4 |
| 19 | −112.22 | 4.38 | | |
| 20 | 21.27 | 7.67 | 1.744 | 44.8 |
| 21 | ∞ | 3.3 | 1.741 | 52.6 |
| 22 | 15.46 | 114.89 | | |
| 23 | −197.29 | 2.98 | 1.5085 | 61.2 |
| 24 | 38.36 | 4.9 | | |
| 25 | 48.8 | 7.88 | 1.456 | 90.3 |
| 26 | −31.16 | 3.15 | 1.5085 | 61.2 |
| 27 | −42.51 | 12.53 | | |
| 28 | ∞ | 18.77 | | |
| 29 | 167.48 | 5.79 | 1.4875 | 70.2 |
| 30 | −60.93 | 3.8 | 1.7185 | 33.5 |
| 31 | −106.39 | 161.61 | | |
| (OCULAR OPTICAL SYSTEM 4) | | | | |
| 32 | −22.29 | 2.28 | 1.8052 | 25.4 |
| 33 | −14.64 | 1.07 | 1.5163 | 64.1 |
| 34 | 22.29 | 17.15 | | |
| 35 | −43.68 | 5.0 | 1.755 | 52.3 |
| 36 | −21.78 | 0.29 | | |
| 37 | ∞ | 1.79 | 1.8052 | 25.4 |
| 38 | 36.41 | 7.85 | 1.7292 | 54.7 |
| 39 | −49.98 | 0.29 | | |
| 40 | 49.98 | 7.85 | 1.7292 | 54.7 |
| 41 | −36.41 | 1.79 | 1.8052 | 25.4 |
| 42 | ∞ | 0.29 | | |
| 43 | 21.78 | 3.57 | 1.755 | 52.3 |
| 44 | 43.68 | | | |

K = 0.5
Fntl = 200
Ftl = 360
βRL = 0.9
Fne = 12.5
Fe = 25
FN = 16
2ω = 65.2°
Fob = 36
M' = Ftl/Fob × 250/Fe = 100
M = Fntl/Fob × βRL × 250/Fne = 100

In the above, K is a coefficient, Fntl is the focal length of the image-forming optical system 3, Ftl is the focal length of a reference image-forming optical system 3' having a magnification of 1×, βRL is the magnification of the relay optical system 6, Fne is the focal length of the ocular optical system 4, Fe is the focal length of the reference ocular optical system 4' in the inverted microscope 1' including the reference image-forming optical system 3' and the reference objective optical system 2', FN is the field number of the ocular optical system 4, which is equal to the diameter of the intermediate image C, 2ω is the viewing angle of the ocular optical system 4, M is the overall magnification of the inverted microscope 1 of this Example, Fob is the focal length of the objective optical system 2 and the reference objective optical system 2', and M' is the overall magnification of the inverted microscope 1' including the reference objective optical system 2', the reference image-forming optical system 3', and the reference ocular optical system 4'.

On the basis of the embodiment described above, inventions as follows are derived.

An aspect of the present invention provides an inverted microscope comprising an objective optical system that collects light from a specimen; an image-forming optical system that images the light from the specimen that has been collected by the objective optical system to form an intermediate image; a relay optical system that relays the intermediate image formed by the image-forming optical system; an light-splitting unit that splits the light from the relay optical system; and a pair of ocular optical systems that image, in a magnified manner, the intermediate images that have been split by the light-splitting unit as on eyes of an observer virtual images; wherein following conditional expressions are satisfied:

$$K=(Fntl/Ftl) \times \beta RL \qquad (1),$$

$$Fne = Fe \times K \qquad (2), \text{and}$$

$$0.3 < K < 0.9 \qquad (3),$$

where K is a coefficient; Fntl is a focal length of the image-forming optical system; Ftl is a focal length of a reference image-forming optical system having a magnification of 1×; $\beta RL$ is a magnification of the relay optical system; Fne is a focal length of the ocular optical system; and Fe is a focal length of a reference ocular optical system in an inverted microscope including the reference image-forming optical system and a reference objective optical system.

According to this aspect, in comparison with an inverted microscope having the reference image-forming optical system having a magnification of 1× and the reference ocular optical system, the focal length of the ocular optical systems is reduced to increase the magnification, and the overall magnification of other optical systems, including the image-forming optical system and relay optical system, is reduced by the same percentage thereas. By doing so, it is possible to increase the magnification of the ocular optical system and to make the field numbers substantially the same without changing the overall magnification of the inverted microscope. "Making the field numbers substantially the same" means that the field of view remains the same even when the magnification of the reference ocular optical system and the magnification of the ocular optical systems are different. In this case, because the overall magnification of other optical systems, including the image-forming optical system and the relay optical system, is reduced, the diameter of the beam passing through a prism in the binocular lens barrel becomes smaller, and it is possible to make the prism and the binocular lens barrel smaller. If K≤0.3, then the focal length of the image-forming optical system becomes too short, making it impossible to ensure a sufficient air equivalent optical path length before splitting into left/right images in the binocular lens barrel, or the magnification of the relay optical system becomes too small, making the design more difficult. If Kt≥0.9, then it is not possible to realize a reduction in size of the prism in practice.

In the above-mentioned aspect, the following conditional expression may be satisfied:

$$15 < FN < 22 \qquad (4).$$

In this expression, FN is the field number of the ocular optical systems.

In addition, in the above-mentioned invention, the following conditional expression may be satisfied:

$$0.45 < K \qquad (5).$$

In this expression, FN is the field number of the ocular optical systems.

Accordingly, in comparison with the case in which K≤0.45, the focal length of the ocular optical system can be made longer, and the comatic aberration characteristics of the ocular optical system are improved.

In addition, in the above-mentioned invention, the following conditional expression may be satisfied:

$$140 < Fntl < 210 \qquad (6),$$

$$0.55 < \beta RL < 1.1 \qquad (7), \text{and}$$

$$8 < Fne < 23 \qquad (8).$$

Other Embodiments

Although the inverted microscope 1 according to the first embodiment has a shorter focal length Fntl of the image-forming optical system 3 as compared with the reference image-forming optical system 3' having a magnification of 1×, other aspects may be employed. More specifically, the focal length Fntl of the image-forming optical system 3 may be equal to the focal length Ftl of the reference image-forming optical system 3'. In this case, in order to satisfy conditional expressions (1) to (3) according to the first embodiment, the magnification $\beta RL$ of the relay optical system 6 is reduced.

By doing so, in comparison with an inverted microscope 1' having a reference image-forming optical system 3' having a magnification of 1× and a reference ocular optical system 4', the focal length of the ocular optical system 4 is reduced to increase the magnification, and the overall magnification of the objective optical system 2, the image-forming optical system 3, and the relay optical system 6 is reduced by the same percentage thereas. Therefore, even in this case, it is possible to make the field numbers of the ocular optical systems 4 substantially the same without changing the overall magnification of the inverted microscope 1. In addition, it is possible to make the diameter of the beam passing through the binocular lens barrel 5 smaller to achieve a reduction in the size of the binocular lens barrel 5.

In addition, in the first embodiment, although the objective optical system 2 shown in FIG. 3(a) and the reference objective optical system 2' shown in FIG. 3(b) are the same, other aspects may be employed. More specifically, the magnification of the reference objective optical system 2' shown in FIG. 3(b) may differ from the magnification of the objective optical system 2 shown in FIG. 3(a). In this case, in comparison with the inverted microscope 1' having the reference image-forming optical system 3' having a magnification of 1× and the reference ocular optical system 4', the focal length of the ocular optical system 4 is reduced to increase the magnification, and the overall magnification of the objective optical system 2, the image-forming optical system 3, and the relay optical system 6 is reduced by the same percentage thereas. By doing so, it is possible to reduce the overall length of the ocular optical systems 4 and to make the field numbers substantially the same without changing the overall magnification of the inverted microscope 1. In addition, it is possible to make the diameter of the beam passing through the binocular lens barrel 5 smaller to achieve a reduction in the size of the binocular lens barrel 5.

What is claimed is:
1. An inverted microscope comprising:
an objective optical system that collects light from a specimen;
an image-forming optical system that images the light from the specimen that has been collected by the objective optical system to form an intermediate image;
a relay optical system that relays the intermediate image formed by the image-forming optical system;
an light-splitting unit that splits the light from the relay optical system; and a pair of ocular optical systems that image, in a magnified manner, the intermediate images that have been split by the light-splitting unit on eyes of an observer as virtual images;

wherein the following conditional expressions are satisfied:

$$K=(Fntl/Ftl)\times \beta RL \quad (1),$$

$$Fne=Fe\times K \quad (2), \text{ and}$$

$$0.3<K<0.9 \quad (3),$$

wherein
K is a coefficient;
Fntl is a focal length of the image-forming optical system;
Ftl is a focal length of a reference image-forming optical system having a magnification of 1×;
βRL is a magnification of the relay optical system;
Fne is a focal length of the ocular optical system; and
Fe is a focal length of the ocular optical system in an inverted microscope including the reference image-forming optical system and a reference objective optical system.

2. An inverted microscope according to claim 1, satisfying the following conditional expression:

$$15<FN<22 \quad (4);$$

wherein FN is a field number of the ocular optical system.

3. An inverted microscope according to claim 1, satisfying the following conditional expression:

$$0.45<K \quad (5).$$

4. An inverted microscope according to claim 2, satisfying the following conditional expression:

$$0.45<K \quad (5).$$

5. An inverted microscope according to claim 1, satisfying the following conditional expressions:

$$140<Fntl<210 \quad (6),$$

$$0.55<\beta RL<1.1 \quad (7), \text{ and}$$

$$8<Fne<23 \quad (8).$$

6. An inverted microscope according to claim 2, satisfying the following conditional expressions:

$$140<Fntl<210 \quad (6),$$

$$0.55<\beta RL<1.1 \quad (7), \text{ and}$$

$$8<Fne<23 \quad (8).$$

7. An inverted microscope according to claim 3, satisfying the following conditional expressions:

$$140<Fntl<210 \quad (6),$$

$$0.55<\beta RL<1.1 \quad (7), \text{ and}$$

$$8<Fne<23 \quad (8).$$

* * * * *